(12) United States Patent
Rigobert et al.

(10) Patent No.: US 8,802,256 B2
(45) Date of Patent: Aug. 12, 2014

(54) SAFETY DEVICE FOR A SEALED CELL

(75) Inventors: Gerard Rigobert, Fargues St. Hilaire (FR); Claude Gilabert, Le Pian Medoc (FR); Jonac Philippe, Gradignan (FR); Dominique Ligeois, St Loubes (FR)

(73) Assignee: SAFT, Bagnolet (FR)

( * ) Notice: Subject to any disclaimer, the term of this patent is extended or adjusted under 35 U.S.C. 154(b) by 0 days.

(21) Appl. No.: 13/112,273

(22) Filed: May 20, 2011

(65) Prior Publication Data

US 2011/0223449 A1  Sep. 15, 2011

Related U.S. Application Data

(62) Division of application No. 11/035,967, filed on Jan. 18, 2005.

(30) Foreign Application Priority Data

Jul. 23, 2004  (FR) ..................................... 04 08182

(51) Int. Cl.
*H01M 2/12* (2006.01)
(52) U.S. Cl.
USPC .............................................. 429/56; 429/53
(58) Field of Classification Search
CPC .................................................... H01M 2/1241
USPC ......................................................... 429/56
See application file for complete search history.

(56) References Cited

U.S. PATENT DOCUMENTS

| | | | |
|---|---|---|---|
| 4,256,812 A * | 3/1981 | Tamura et al. | 429/56 |
| 5,523,178 A | 6/1996 | Murakami et al. | |
| 5,677,076 A | 10/1997 | Sato et al. | |
| 5,714,606 A | 2/1998 | Mayer et al. | |
| 6,432,572 B1 | 8/2002 | Yoshida et al. | |
| 2003/0194601 A1 | 10/2003 | Lei | |

FOREIGN PATENT DOCUMENTS

| | | | |
|---|---|---|---|
| DE | 37 22 020 A1 | 1/1989 | |
| EP | 0895297 | 2/1999 | |
| EP | 0964469 | 12/1999 | |
| EP | 0969535 * | 1/2000 | H01M 2/26 |
| FR | 2 846 796 A1 | 5/2004 | |
| JP | 11-213978 A | 8/1999 | |

* cited by examiner

*Primary Examiner* — Barbara Gilliam
*Assistant Examiner* — Steven Scully
(74) *Attorney, Agent, or Firm* — Sughrue Mion, PLLC

(57) ABSTRACT

A safety device for a sealed cell (1) comprising alternating positive and negative electrodes respectively connected to positive and negative current output terminals (6, 7) placed in a container (2) having an end (3) that is closed by a wall. The wall of the closed end presents thinning (13) adapted to be torn by excess pressure inside the container, and the thinning is adapted, on being torn, to interrupt electrical conduction between the electrodes of one polarity and the corresponding current output terminal. The device of the invention is simple in design, is capable of operating at low pressures, and over a wide range of pressures, and acts as a circuit interrupter without decreasing the current density that flows in the electrical circuit.

12 Claims, 2 Drawing Sheets

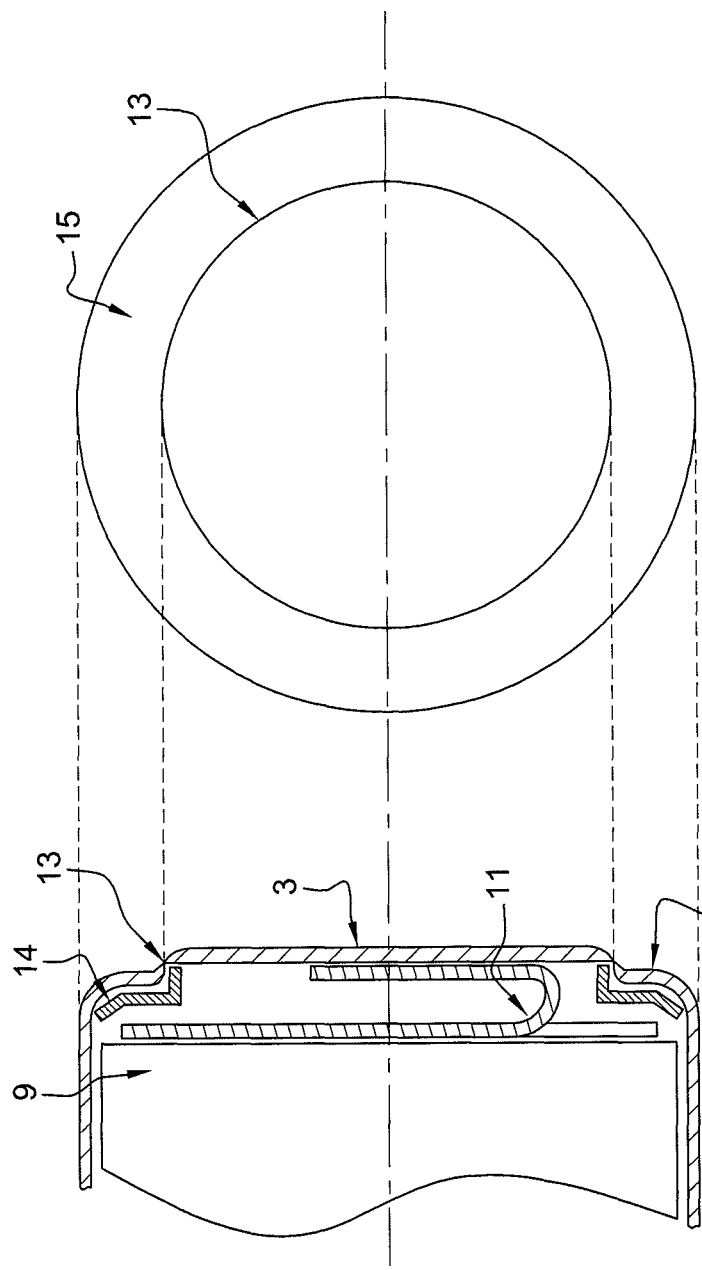

SAFETY DEVICE FOR A SEALED CELL

CROSS-REFERENCE TO RELATED APPLICATIONS

This application is a Rule 53(b) divisional of U.S. application Ser. No. 11/035,967 filed on Jan. 18, 2005, and which claims priority from FR 04 08 182, filed Jul. 23, 2004. The entire disclosure of the prior application is hereby incorporated by reference.

BACKGROUND OF THE INVENTION

The present invention relates to a safety device for a sealed cell. It also covers a method of manufacturing such a device.

A sealed electrochemical cell (or "battery") comprises in conventional manner an electrochemical stack made up of alternating positive and negative electrodes on either side of separators impregnated in electrolyte. Each electrode is made up of a metal current collector supporting an electrochemically active material on at least one of its faces. Each electrode is electrically connected to a current output which provides electrical continuity between the electrode and an external application with which the cell is associated. The stack of electrodes is placed in a container that is closed in sealed manner by a cover.

The invention relates to sealed cells of the nickel cadmium, nickel metal hydride, and lithium ion types. These cells may be of cylindrical format or of rectangular format (also known as prismatic format). They constitute cells that are rechargeable, also known as secondary cells or as accumulators.

A cell is generally designed to operate under so-called "nominal" conditions, i.e. within given ranges of temperature, current, and voltage. When a sealed cell is used outside the nominal conditions, for example in the event of accidental overcharging, or a short circuit, or temperature higher than the maximum operating temperature, etc., there is a danger of explosion. This is because such situations lead to the electrolyte heating and to electrolyte vapor being formed. An accumulation of such vapor inside the container increases the internal pressure of the cell and that can lead to the container bursting violently and to chemical compounds being sprayed out that are harmful and corrosive for the environment and for people situated nearby.

Safety devices exist that prevent gas from accumulating inside the container of a sealed cell and that enable the gas to be exhausted when the internal pressure exceeds a predetermined value.

Known safety devices are generally constituted by valves. U.S. Pat. No. 5,523,178 describes a valve for a cell. That valve nevertheless presents the drawback of being complex in design. When valves are simple in design they suffer from the drawback of opening only at pressures that are high or opening only over a narrow range of pressures.

Furthermore, it is necessary for a cell safety device also to possess a circuit interrupter function suitable for electrically and irreversibly isolating apparatus connected to the cell. Known valves do not perform this circuit interrupter function. A specific electrical device must be provided for performing the circuit interrupter function when the valve is activated.

There therefore exists a need for a safety device for a sealed cell which is simple in design, suitable for low pressures, and capable of operating over a wide range of pressures. There also exists a need for a safety device that acts simultaneously as a circuit interrupter.

An object of the present invention is to solve the above-mentioned problems.

SUMMARY OF THE INVENTION

To this end, the invention provides a safety device for a sealed cell comprising alternating positive and negative electrodes respectively connected to positive and negative current output terminals, the electrodes being disposed in a container presenting an end that is closed by a wall presenting thinning adapted to be torn by excess pressure inside the container, the thinning being adapted, on being torn, to interrupt electrical conduction between the electrodes of one polarity and the corresponding current output terminal.

According to a characteristic, the thinning constitutes a zone of weakness in the wall at the closed end.

According to a characteristic, the end closed by a wall supports the current output terminals.

According to a characteristic, a cover placed on an open end of the container supports the current output terminals.

In embodiments, the tear is adapted to interrupt electrical conduction between the positive electrodes and the positive current output terminal or between the negative electrodes and the negative current output terminal. Depending on the application, the sealed cell is cylindrical in format or prismatic.

According to a characteristic, the sealed cell operates with the pressure inside the container lying in the range 4 bars to 20 bars, and preferably in the range 8 bars to 12 bars.

According to a characteristic, the thickness of the thinning represents substantially 20% of the wall thickness at the closed end of the container.

According to a characteristic, a rim of the wall of the closed end is adapted to prevent the electrodes being expelled in the event of the thinning being torn.

The invention also provides a method of manufacturing a safety device for a sealed cell, the method comprising the steps consisting in:

providing a container presenting an end that is closed by a wall;

stamping the wall at the closed end so as to create thinning suitable for being torn by excess pressure inside the container;

placing a stack of positive and negative electrodes inside the container; connecting the electrodes to current output terminals so that tearing the thinning interrupts electrical conduction between the terminals of one polarity and the corresponding current output terminal; and closing the cell in sealed manner.

Other characteristics and advantages of the invention appear on reading the fowling description given by way of example and with reference to the FIGS.

BRIEF DESCRIPTION OF THE DRAWINGS

FIGS. 2A and 2B are respectively a longitudinal section view and a cross-section view of the safety device of the invention.

DETAILED DESCRIPTION OF THE INVENTION

Figure 1:
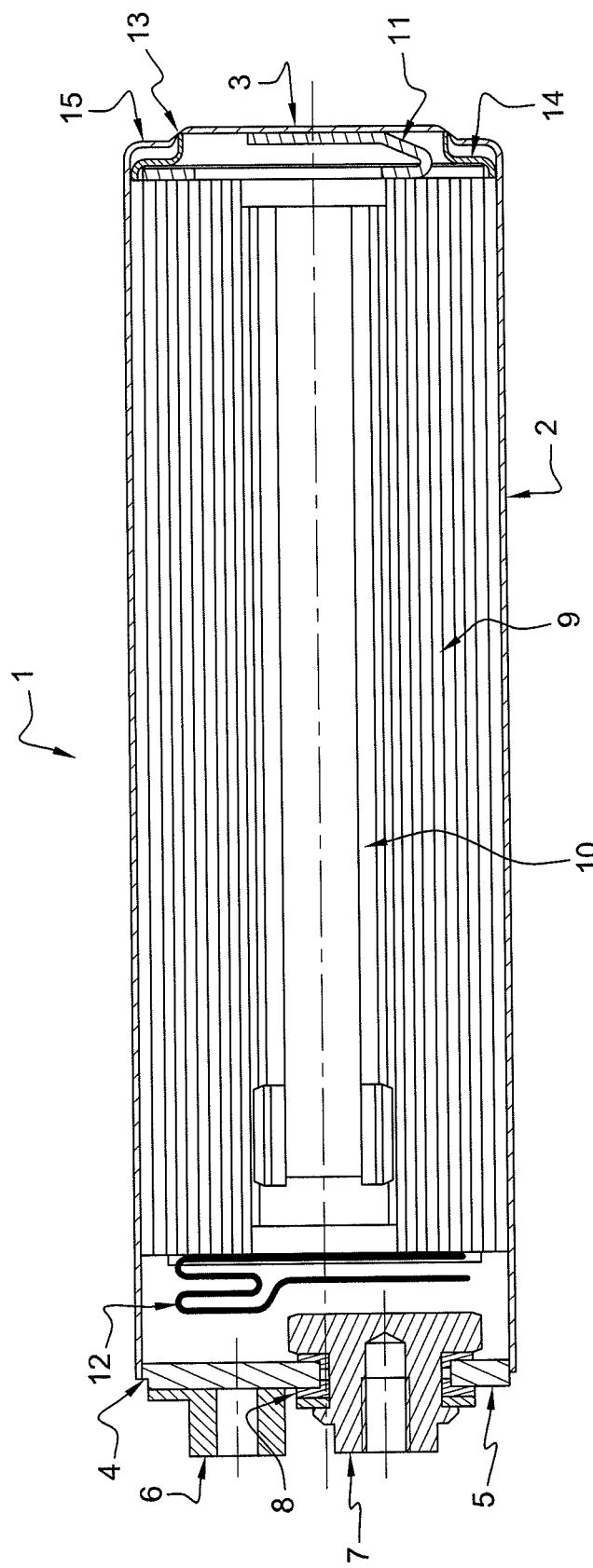
FIG. 1 is a longitudinal section view of a sealed lithium ion cylindrical cell provided with a safety device of the invention.

The invention provides to a safety device for a sealed cell. The cell comprises alternating positive and negative electrodes respectively connected to positive and negative current outlet terminals. The electrodes are disposed in a container presenting one end that is closed by a wall. The wall of the closed end presents thinning (i.e. a portion of reduced thickness) suitable for being torn by excess pressure inside the container. On being torn, the thinning is adapted to interrupt electrical conduction between the electrodes of one polarity and the corresponding current output terminal.

Thus, in the event of the pressure inside the cell exceeding a predetermined threshold value, the thinning tears and serves to exhaust the gas, thereby preventing the cell from exploding. The device also acts as a circuit interrupter by simultaneously interrupting electrical conduction between the electrodes of one polarity and the corresponding current output terminal.

A preferred embodiment of the invention is described below by way of example.

FIG. 1 is a longitudinal section view of a sealed cylindrical lithium ion cell 30 provided with a safety device of the invention.

The cell 1 comprises a container possessing a cylindrical wall 2 closed at one end by an end wall 3 and open at its opposite end 4. A cover 5 is placed on the open end. It supports current output terminals 6 and 7. One of the current output terminals, in the example described the positive terminal 6, is welded to the cover. The other current output terminal, in the example described in the negative terminal 7, passes through the cover. It is secured thereto by any suitable means such as screw-fastening or crimping. A gasket 8 insulates the negative current output terminal 7 electrically from the cover.

An electrochemical stack 9 constituted by a winding of positive and negative electrodes with a separator is disposed in the container about a hollow shaft 10 which serves as a gas chimney. A connection strip 11 connects the positive electrodes of the stack to the end wall of the container, the walls of the container being electrically conductive and connected to the cover. Another connection strip 12 connects the negative electrodes of the stack to the negative current output terminal. A ring-shaped gasket 14 is placed between the electrochemical stack and the end wall of the container. It provides electrical insulation so as to prevent electrical contact being made between the edge of a negative electrode in the stack and the wall of the container that is connected to the positive electrode, since that could give rise to a short circuit.

In the invention, the closed end 3 constituted by the end wall of the container presents thinning 13. This thinning is adapted to be torn by excess pressure inside the container. In the example shown, when the thinning tears it is adapted to interrupt electrical conduction between the positive electrodes and the positive current output terminal. FIG. 2B shows that the thinning is circular in shape with a diameter constituting about 75% of the diameter of the container for a cell that is cylindrical. The thickness of the thinning is about 20% of the thickness of the wall at the closed end of the container. The thinning that is implemented constitutes a zone of weakness in the closed end, and it tears under gas pressure. The thickness of the thinning can be adjusted as a function of the looked-for opening pressure and the mechanical strength of the container. The material of the container is preferably aluminum. Alternatively, nickel-plated steel or copper could be used. Depending on the thickness of the thinning, an opening pressure lying in the range 4 bars to 20 bars can be obtained. The thickness of the thinning is preferably selected so that the opening pressure lies in the range 8 bars to 12 bars. The safety device is thus suitable for operation at low pressure and over a broad range of pressures. The non-deformed portion of the closed end wall forms a rim 15 that serves to prevent the electrochemical stack being expelled in the event of the thinning being torn.

One possible method of manufacturing a cell of the invention is described below. This description refers to a cylindrical cell.

A thinning 13 is made in a portion of the wall of the closed end 3 of the container by stamping the container material in a press.

A gasket 14 is inserted in the end of the container. It covers the thinning and the rim at the closed end. It is made of a material that withstands high temperatures such as polyetherimide (PEI).

Thereafter the electrochemical stack is made. The positive electrode is constituted by a current collector, which may be an aluminum foil, covered in an active material constituted by a lithium-containing oxide of transition metals such as $LiCoO_2$, $LiNiO_2$, $LiMnO_2$, $LiMn_2O_4$, or a mixture thereof.

The negative electrode is constituted by a current collector, which may be a copper foil, covered in an active material constituted by a material in which lithium can be inserted reversibly, such as graphite, coke, vitreous carbon, or carbon black.

The separator may be a polyolefin. At least one positive electrode, at least one separator, and at least one negative electrode are superposed to form the electrochemical stack 9. The electrochemical stack is wound around the hollow shaft 10 made of aluminum. The positive and negative electrodes are bonded to their plane connections. A connection strip of plane shape is preferred, but any type of connection could be envisaged.

The electrochemical stack 9 carrying its connections is inserted into the container 2. The electrodes and the separators are impregnated and the container is filled with electrolyte under reduced air pressure inside the container. The electrolyte is constituted by a lithium salt dissolved in an organic solvent. The container is closed in sealed manner by welding a cover 5 to the open end 4 of the container, which cover is fitted with current output terminals 6 and 7.

The operation of the safety device is described below.

The thinning 13 created in the closed end 3 of the cell constitutes a zone of weakness. When the wall at the closed end is not strong enough to withstand the pressure of electrolyte vapor, the thinning tears. The pressure is exhausted through the tear and the pressure inside the cell drops to atmospheric pressure. Simultaneously with the appearance of the tear, electrical conduction between the plane connection of the positive electrode 11 and the wall of the container 2 is interrupted, thereby interrupting the supply of power to the electrical load. When the thinning is torn in part only, excess pressure is exhausted, but the circuit-interrupting function is not provided. Current flow in the electrical circuit needs to be interrupted by an operator.

The safety device is simple in design and combines the functions of a valve and of a circuit interrupter. It does not require any additional parts that need to be assembled to make the cell, thereby giving the safety device a high degree of reliability.

The safety device of the invention also presents the advantage of not reducing the density of the current flowing in the electrical circuit as happens when series-connected circuit interrupters are used. The thickness selected for the thinning is a compromise between the largest possible section in order to pass current and the smallest possible section in order to ensure that the thinning tears.

The safety device is thus well adapted to high-power applications (e.g. hybrid vehicles), in which high current densities are used.

Another advantage of the invention lies in the fact that the electrochemical stack is retained inside the container in the event of the thinning being torn suddenly, since the rim 15 at the closed end prevents the electrochemical stack from being ejected. The opening created by tearing the thinning is too narrow to allow the electrochemical stack to pass through. The risks of dangerous chemical substances being sprayed out is thus limited.

The present embodiment and the drawings should be considered as being presented by way of non-restricted illustration, and the invention is not limited to the details provided herein, but can be modified while remaining within the ambit and the scope of the accompanying claims. In particular, the end of the container that is closed by a thinned wall may be the end that supports the current output terminals.

What is claimed is:

1. Method of preventing pressure in a lithium-ion sealed cell from exceeding a certain level, comprising:
    providing a container, the container comprising:
    a lateral wall;
    an end wall that is closed by a wall electrically connected to the lateral wall;
    a cover opposite the end wall; and
    thinning a thinning portion of said end wall;
    providing alternating positive and negative electrodes in the container, respectively connected to positive and negative current output terminals; wherein at least one of the positive electrode and positive output terminal and the negative electrode and negative output terminal are electrically connected through the thinning portion; and
    providing a connection strip which connects at least one of the positive electrodes and the negative electrodes to the end wall of the container;
    operating the sealed cell,
    wherein the thinning portion is capable of a complete tear and a partial tear, respectively, at an instance when the thinning portion is torn by excess pressure inside the container,
    a complete tearing of the thinning portion results in simultaneously exhausting gas and interrupting electrical conduction between the at least one of the positive electrode and positive output terminal and the negative electrode and negative output terminal, and it is the tearing of the thinning portion that both exhausts gas and interrupts electrical conduction, and
    a partial tearing of the thinning portion results in exhausting excess pressure and not interrupting the electrical conduction.

2. The method according to claim 1, wherein the thinning comprises forming a zone of weakness in the wall at the closed end.

3. The method according to claim 1, wherein the end closed by the wall supports the current output terminals.

4. The method according to claim 1, wherein the cover supports the current output terminals.

5. The method according to claim 1, wherein electrical conduction between the positive electrodes and the positive current output terminal is interrupted.

6. The method according to claim 1, wherein electrical conduction between the negative electrodes and the negative current output terminal is interrupted.

7. The method according to claim 1, wherein the sealed cell is cylindrical.

8. The method according to claim 1, wherein the sealed cell is a prismatic format sealed cell.

9. The method according to claim 1, further comprises preventing the electrodes from being ejected in the even the thinning is torn, wherein a rim of the closed end wall prevents the electrodes from being ejected.

10. The method according to claim 1, wherein the operating comprises operating at pressures inside the container in the range 4 bars to 20 bars.

11. The method according to claim 1, wherein the operating comprises operating at pressures inside the container in the range 8 bars to 12 bars.

12. The method according to claim 1, wherein the thinning comprises thinning a portion of said wall to substantially 20% of the thickness of the wall at the closed end of the container.

* * * * *